United States Patent Office 3,373,614
Patented Mar. 19, 1968

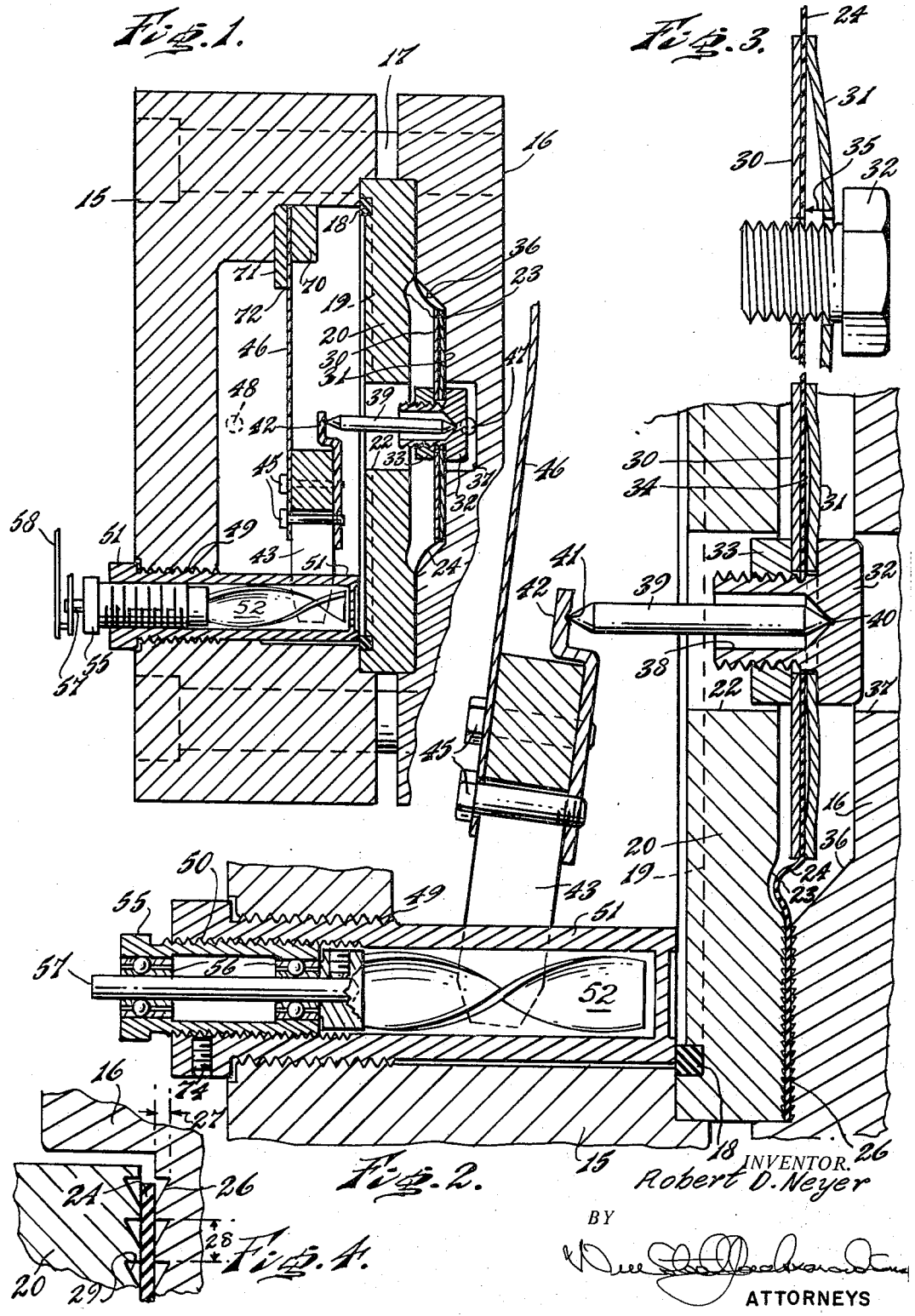

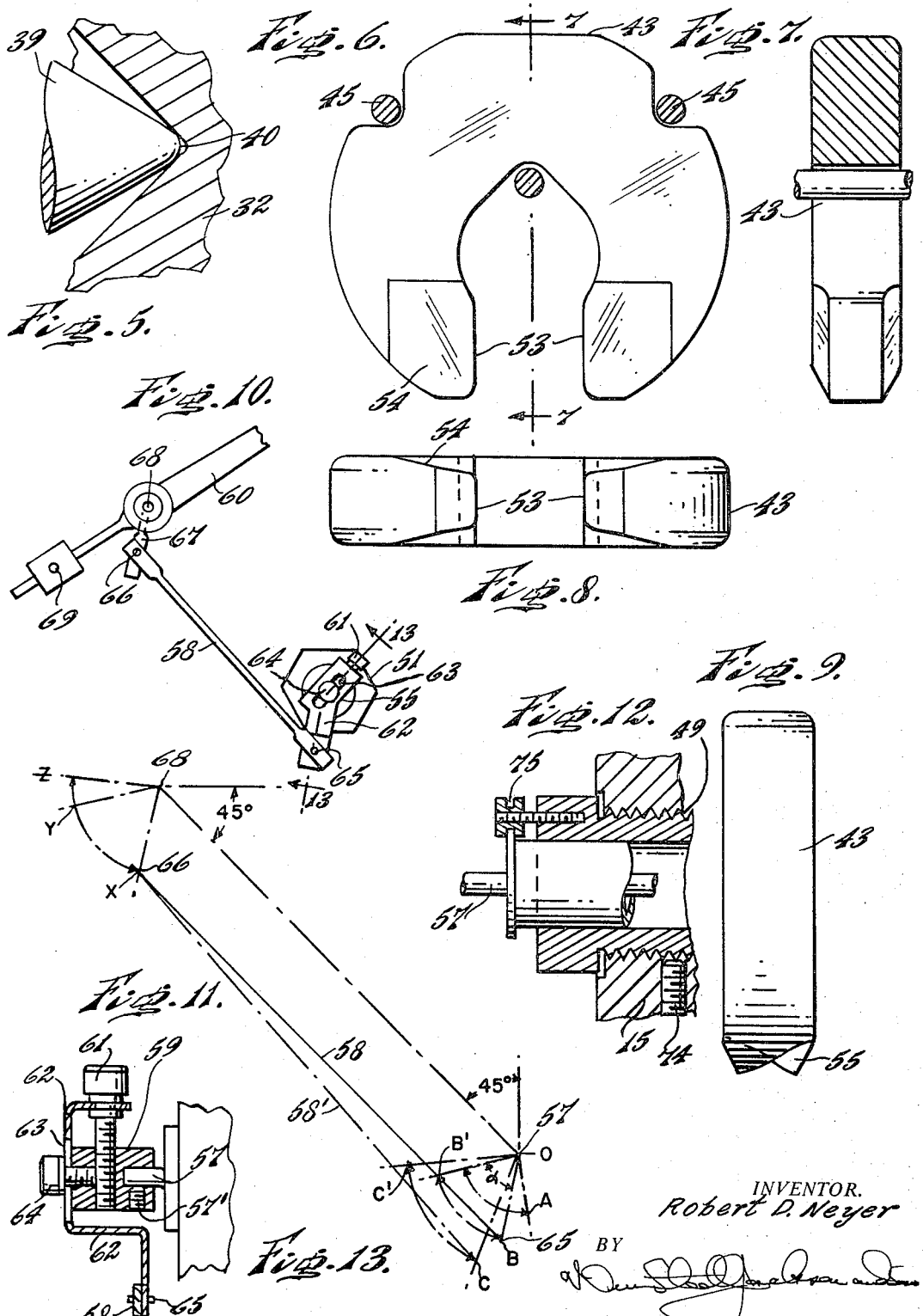

3,373,614
DIFFERENTIAL PRESSURE GAUGE
Robert D. Neyer, Oreland, Pa., assignor to Yarway Corporation, Philadelphia, Pa., a corporation of Pennsylvania
Filed Oct. 23, 1965, Ser. No. 503,891
6 Claims. (Cl. 73—407)

ABSTRACT OF THE DISCLOSURE

In the present differential pressure indicator of the type utilizing coupling between magnet and spiral armature to bring the indication outside of the pressure vessel, the spiral armature is cantilever mounted with adjustment from the outside at one end, the magnet is narrowed down in the axial direction of the armature to one-sixth the pitch of the armature at its flat face, the pressure diaphragm has a constant effective operating area, for which there is positive securing against slipping, improved edge mounting means, clamping plates for stiffening the central portion and prevention of displacement beyond operative positions, the magnet is mounted to a resilient element biased against diaphragm movement and external adjustable linkage alters the gauge range without disturbing its zero position.

---

The present invention relates to a differential pressure indicator useful as a liquid level gauge, pressure gauge, flow meter or the like. More particularly, the invention relates to improvements in the differential pressure gauge as described and claimed in U.S. Patent No. 2,509,644.

A purpose of this invention is to provide an improved differential pressure gauge.

A further purpose of this invention is to provide a constant effective operating area for the diaphragm of such a gauge in all operative positions of the diaphragm in order to improve the stability of the gauge, the diaphragm functioning as the element responsive to the differential pressures.

A further purpose of this invention is to positively secure the edge and the central portions of the diaphragm against slipping or stretching in order to maintain this constant diaphragm area.

A further purpose of this invention is to provide an improved means for mounting the edge of the diaphragm with respect to the housing of the indicator.

A further purpose of this invention is to provide improved clamping plates for stiffening the central portions of the diaphragm.

A further purpose of this invention is to prevent the displacement of the diaphragm beyond its operative positions in case of extreme pressure differentials or over pressures on either side of the diaphragm.

A further purpose of this invention is to concentrate the flux of a magnet moving in response to movement of the diaphragm in order to increase the sensitivity of movement of a magnetic responsive element actuated by movement of the magnet.

A further purpose of this invention is to shape the pole faces of the magnet to conform them to the pitch of a spiral shaped magnetic responsive element used in the indicator mechanism.

A further purpose of this invention is to improve the mounting of the motion translation means which translates lateral movements of the diaphragm to the magnet.

A further purpose of this invention is to improve the mounting of the magnet to a resilient element which is biased against movement of the diaphragm.

A further purpose of this invention is to provide an external adjustment for the magnetically responsive element to vary the relationship of the magnet to the element for zero-setting the indicator.

A further purpose of this invention is to provide an exernal adjustable linkage system to alter the range of the gauge without disturbing its zero position.

Further purposes will appear in the specification and in the claims.

FIGURE 1 is a cross-sectional view of the pressure differential gauge of this invention.

FIGURE 2 is an enlarged fragmentary view of the operating mechanisms of the gauge, with the magnet approximately at the mid-point of its range of travel.

FIGURE 3 is an enlarged fragmentary cross-sectional view showing the relationship of a preformed clamping plate with respect to the diaphragm and another clamping plate prior to being tightened.

FIGURE 4 is an enlarged fragmentary view showing the sealing of the diaphragm to the housing.

FIGURE 5 is an enlarged fragmentary view showing the relationship of the pin with its bearing in either the diaphragm or the magnet plate.

FIGURE 6 is a plan view of the magnet.

FIGURE 7 is a sectional view of the magnet taken along the lines 7—7 of FIGURE 6.

FIGURE 8 is a bottom view of the magnet of FIGURE 6 showing the narrowed pole faces.

FIGURE 9 is a side view of a magnet showing an alternative shape for the pole faces of the magnet to conform them to the pitch of the spiral shaped armature.

FIGURE 10 is a fragmentary view showing the range adjustment linkage between the armature axis and the indicator arm.

FIGURE 11 is a schematic view of the range adjustment linkage.

FIGURE 12 shows an alternative form for axial adjustment of the armature with respect to the magnet.

FIGURE 13 is an enlarged fragmentary sectional view taken along the lines 13—13 of FIGURE 10 showing the mounting of the range adjustment mechanism to the shaft of the armature.

Describing in illustration only and not in limitation with reference to the drawings:

In Kinderman U.S. Patent No. 2,509,644, for Differential Pressure Gauge, incorporated herein by reference, there is illustrated a gauge indicating, for example, liquid level in terms of pressure. The present invention is concerned with various improvements in this gauge which increase the sensitivity of the device while avoiding variations or instability in performance.

Describing briefly the operating mechanism of the indicator, the gauge includes an outer housing 15 and cover 16 united by bolts 17, shown in phantom, and sealed by a O-ring 18 disposed in an annular groove 19 in a diaphragm support plate 20 to provide a metal to metal contact for accurate positioning of the diaphragm support in order to seal the interior of the indicator device. The instrument may be mounted in any manner desired and suitably by brackets secured to the gauge.

The diaphragm support 20 is apertured at 22 to permit passage of the thrust connection between the diaphragm and the indicating mechanism. The support includes an annular recess 23 to permit collapse into the recess of a circular flexible diaphragm 24. This diaphragm is positively held in place between the outer edge of the diaphragm support 20 and the housing cover 16. A phonographic type finish 26 similar to an Archimedes spiral is provided on both the support and the housing surfaces to prevent the diaphragm from slipping with respect to the housing which helps to maintain a constant diaphragm area for all operative positions of the indicator.

When the diaphragm support was sealed with respect to the housing by means of a gasket, as in prior art devices, the gasket was always subjected to solvents in the fluid causing swelling or to the pressure of the housing against the support plate causing compression or creeping of the diaphragm. After the gasket became worn, and began to break down, the diaphragm would tend to shift with variations of load on the diaphragm. This frequent variation in the area of the diaphragm being subjected to the pressure differential hindered the stability of the indicator resulting in onconsistent indications.

The phonographic finish, however, provides a positive seal with the diaphragm itself which is independent of variations of load in the diaphragm. With reference to FIGURE 4, the finish should have a groove depth 27 not to exceed one third of the thickness of the diaphragm, with the distance 28 between the grooves being approximately equal to the diaphragm's thickness. For example, with a diaphragm thickness of around .012 inch, the depth of the groove should be approximately, between .002 and .004 inch, with the distance 28 between grooves being approximately .012 inch. With these dimensions, the groove should have an angle 29 of approximately 60°.

The groove acts like a labyrinth because there is such tremendous length that leakage cannot occur. The diaphragm tends to penetrate the grooves to some extent in order to further hold it in place, this penetration providing expansion of non-metallic diaphragm elements in order to prevent crushing at higher torque loadings and additionally permitting a reduction in the number of bolts 17 required for sealing.

The diaphragm 24 may suitably be constructed of various synthetic rubbers and elastomers such as Buna N, neoprene, butyl rubber, etc., and nylon and Dacron may be used as reinforcing base materials into which an elastomer can be impregnated.

At its center, the diaphragm is stiffened and supported to move as a unit by diaphragm clamping plates 30 and 31 on either side of the diaphragm so as to confine flexing of the diaphragm to the outer operating areas. Previously flat plates were used to stiffen the diaphragm, but this led to the plates meeting at the center where they were held to the diaphragm by a suitable nut and bolt arrangement with a bulging out at their ends. This permitted the diaphragm to wobble within the space between the plates, resulting in its stretching in operation or changing in shape with respect to its center. This affected the accuracy of the instrument and hence it was necessary to provide a clamping means that was rigid with respect to the diaphragm so that a constant effective diaphragm area could be maintained during its entire operation.

This invention provides a flat clamping plate 30 on one side of the diaphragm 24 and a preformed dished or cupped shaped plate 31 on the other. Bolt 32 passes through a central aperture in both plates and the diaphragm onto which is threaded a nut 33 on the opposite side. Prior to clamping, the dish shaped plate 31 is extended at its center as shown in FIGURE 3. After clamping with diaphragm bolt 32, the plate bows and clamps the diaphragm as shown in FIGURE 2. This clamping applies elastic compression at the outer edge where it engages the diaphragm and the inner end where it is tightly gripped by the nut and bolt leaving a gap 34 in the middle. This securely holds the diaphragm preventing any stretching or wobbling at the outer edges thus maintaining a constant diaphragm area.

The amount of cupping of plate 32 controls the amount of diaphragm spring compression based on the thickness of the plate. The preformed or cupped clamping plate should preferably be one half the thickness of the flat plate 31 and should be approximately three times the thickness of the diaphragm. Before clamping, the free height 35 of the cupped plate should be approximately three times its thickness per inch of radius. Hence with a diaphragm .012 inch in thickness and with a clamping plate having a radius of 1 inch, the thickness of the flat plate should be approximately .072 inch and the thickness of the curved clamping plate around .036 inch. This requires then that the distance 35 between the height of the cupped plate and the diaphragm, before clamping, should be approximately .108 inch.

The housing 16 is concave at 36 in order to give room for the diaphragm and its plates within the housing. It suitably includes depression 37 to make room for the head of bolt 32. The surface 36 of the housing 16 supports the diaphragm at an extreme position and presents displacement of the diaphragm beyond its operating positions in case of an extreme pressure differential or over pressure on the left hand side of the diaphragm as shown in FIGURE 1. Similarly the surface of support plate 20 prevents displacement in case of over pressures on the right hand side of the diaphragm.

The bolt 32 includes an annular inner portion 38 for convenient application to it of a pin connection between the diaphragm and the indicating mechanism. This portion 38 is used to support the pin 39 during construction of the gauge but yet will be free from contact with the pin during the operation of the gauge. In the particular transmission shown, there is provided a pin or pressure rod 39 resting in pin bearing 40 within the bolt 32. To maintain a constant pin position with respect to the bearing, the contact area between the pin and the bolt 32 is minimized by coining the bearing or socket. The pin bearing is suitably made of a work hardenable material, for example, 304 stainless steel and has an initial socket of a greater included angle and smaller radius than the end of the pin. The pin is of a harder material which has been machined and conveniently is composed of, for example, 17–4PH precipitation hardened stainless steel. After machining, the pin is heat treated and then polished with an abrasive. The socket is coined so as to work harden the surface of the socket. In this way the pin does not fully seat at its point but rather finds a sort of ring contact with the pin bearing thus maintaining a more constant pin position as shown in FIGURE 5.

The pin 39 is also pointed at the other end to engage with a coined pin bearing or socket 41 in bearing plate 42. The bearing plate is attached to one side of the magnet 43 with an offset bend in the plate so that the bearing is located in line with the pin 39. The magnet 43 is held to leaf spring 46 by screws 45 passing through slots in the magnet and fastened to bearing plate 42.

In prior art devices, the pin bearing for the magnet was formed in a thimble, the end of which was secured to a leaf spring attached to one side of the magnet with the forward or open end of the thimble being supported by a plate attached to the other side of the magnet. Thus the thimble had to be of the exact same thickness of the magnet, for if it was not, the instrument would be continually out of alignment as the bearing would be improperly secured. Hence this improvement in the arrangement of the pin connection to the magnet avoids the difficulties of variations in the thickness of the magnet since the bearing plate is now mounted to the magnet 43 independent of the leaf spring 46.

Since the magnet, attached to the leaf spring, moves in an arc about the fulcrum of the spring, the pin will not always be horizontal. The socket 41 in plate 42 is positioned so that the end of the pin in socket 41 at the beginning of the stroke of the diaphragm will be slightly above the horizontal, while at the mid-point of the stroke it will be horizontal as shown in FIGURE 2 and at the end of the stroke it will be slightly below. The other end of the pin will travel along the horizontal due to the substantially lateral movement of the diaphragm. Hence the socket 41 must be able to accommodate variations in the inclination of the pin with respect to it. By distributing the inclination of the pin on to both sides of the horizontal, instead of only on one side as in prior art devices, a more linear overall force distribution is obtained thus adding to the accuracy of the machine. Hence the indicator mechanism will move a substantially equal amount for equal increments in pressure whether the diaphragm be at one end of its stroke or at the other. Since the ideal alignment is at the mid-point, where the pin, being on the horizontal and perpendicular to the diaphragm, translates the greatest amount of force created, the closer the pin can be kept to the horizontal the more constant will be the force translated by the pin to the magnet.

The diaphragm is subjected to differential pressure on both sides through pipes 47 and 48 which may represent differences in fluid level, or in pressure on opposite sides of an orifice, or flow over a weir, for example.

The means for transmission of the response of the pressure-sensitive element consists basically of passing magnetic flux from the permanent magnet 43 to a rotatably mounted magnetically susceptible follower, or armature 52 that is mounted in a well 51 and hence is free from pressure within the indicator body.

The magnetic transmission is based on the change in reluctance of the magnetic circuit with movement of the magnet by the diaphragm at right angles to its flux and along the axis of the armature, accompanied by rotary reaction of the armature to the magnet movement to essentially reestablish the reluctance of the magnetic circuit at a balanced position which is thus maintained as a constant.

It is important that the magnetic reluctance for the balanced position of the armature through the range of movement of the pressure sensitive diaphragm remain substantially constant in order to avoid the effect of unbalanced magnetic forces on the indicator mechanism.

The magnet 43 is a permanent magnet of material capable of holding its magnetism over prolonged periods of time, the magnet being a horseshoe magnet having pole faces 53. In the mechanism disclosed in the aforementioned patent, the pole faces were constructed of the same thickness as the magnet. In this invention, however, the pole faces have been narrowed so that they are now thinner than the body of the magnet itself as shown in FIGURE 8. By thinning the pole faces, the flux pattern between them is concentrated over a smaller area thus creating a stronger passage of flux to the armature with improved sensitivity of the indicator. Additionally the narrowing of the pole faces reduces the weight of the magnet, and since the inertia of the magnet must be overcome by the differential force of the diaphragm, this additionally makes the device more sensitive by lightening the load on the diaphragm which minimizes mechanical hysteresis.

The sides of the pole faces are thinned on an arc 54 to approximately two thirds the thickness of the magnet as shown in FIGURE 8. This means that the pole face has a dimension in the axial direction of the armature of approximately one-sixth the armature pitch, as compared to Kinderman's dimension in a similar direction of approximately one-fourth the armature pitch (Kinderman 2,509,644, column 20, lines 58–67). The faces may be flat as shown or be adapted to fit around the well in a curved manner as shown in the above identified patent. Alternatively the faces of the magnet may be contoured around the armature well as shown in FIGURE 9, the contour 55 duplicating the twist of the spiral armature in order to improve the magnetic coupling between the magnet and the armature thus further increasing the sensitivity of the indicator.

Due to the canting of the magnet as the spring plate 46 tilts about the fulcrum, the pole faces must be shaped so that they clear the well at all operative positions of the indicator.

Any good magnetic alloy which is capable of holding its magnetism can be used for the magnet. Sufficient results have been secured by use of a cast magnetic material such as Alnico. Additionally an electromagnet may be used instead of a permanent magnet but practical difficulties of electrical connections make such a magnet undesirable for this type of indicator.

To maintain the magnet movement as nearly as possible parallel to the axis of the armature, it is supported from a spring plate 46, the spring plate and bearing plate being secured to opposite sides of the magnet 43 by the screws 45 passing therethrough.

The armature comprises a spirally twisted strip made of flat magnetically susceptible material and as close fitting to the inside edges of the well as possible without contact of the edges of the spiral with the interior walls of the well, in order that the material may substantially span the space between the two magnet poles.

The well 51 which houses the armature comprises threaded portion 49 for securing the well with respect to the housing 15. Internally, there is a fine adjustment thread 50 into which is threaded a plug 55. Within the plug, there is located miniature double roller or ball bearings 56 for supporting in Cantiliver beam fashion the spiral armature 52 from one end. By supporting the armature with these miniature bearings at one end instead of using jeweled bearings and supporting it at both ends as in the prior art device, friction is further minimized while avoiding the difficulty of end play of the armature which also tends to reduce mechanical hysteresis. The bearing and armature assembly is a sealed unit in order to protect it from dirt and corrosion and the well protects the armature from the internal pressures of the indicator. The shaft 57 extending out from the plug and integrally connected to the armature as shown in FIGURE 2 carries through appropriate linkage 58 a pointer 60 as best shown in FIGURE 10.

Because the mechanism is so sensitive, the zero or at rest position of the indicator may not always indicate zero on the gauge or a dial and hence it is necessary to be able to adjust the indicator mechanism to a zero reading for a particular position of the diaphragm. A convenient adjustment means has been provided with this invention which allows the plug and armature to be moved axially with respect to the magnet until the zero position on the indicator dial or gauge is reached as shown by the pointer 60. The whole plug 55 is turned with respect to the well and adjusted to proper position by means of the fine adjustment threads 50. After the zero position has been reached, the plug and armature position is then locked in place by means of a set screw 74 conveniently threaded through the well 51 by means of a hex wrench.

Alternatively the zero adjustment can be provided for by eliminating the thread 50 and making the bearing assembly slidably adjustable with respect to the well with the set screw 74 holding it in the desired position. In this instance an adjustment screw 75 would be provided in the plug parallel to axis of the bearing for axially adjusting the slidable bearing assembly as shown in FIGURE 12.

In the former indicator as shown in the above identified patent, the zero adjustment of the indicator was accomplished by adjusting the fulcrum with respect to the spring plate, which caused the magnet to move with respect to the armature until the pointer reached the zero point on the dial. By permitting the armature to move laterally with respect to the magnet, this not only more accurately zeroes in the instrument but additionally the fulcrum adjustment mechanism as shown in the above identified patent can be eliminated. The spring plate 46 is now simply secured to the housing 15 by a block 70 against a fulcrum block 71, the bottom edge 72 of this block acting as the fulcrum for the spring plate which plate supports the magnet 43 for pendulum movement along the axis of the spiral armature.

In order that the relation of the spiral armature to the magnet be constant, the pitch of the armature should be as uniform as possible. In that way the armature will rotate equally for every increment of magnet movement causing angular rotation of the armature and hence of the indicator arm to equal extents for equal ranges of movement of the magnet along the armature axis. To insure uniformity of pitch the armature may be investment cast. Further information concerning the construction of the armature and its movement in response to the magnet and the well within which the armature is housed is set forth in the above referred to patent that is incorporated in this application by reference.

Externally of the indicator, instead of attaching the pointer 60 directly to the shaft 57 of the armature, there is provided a linkage arrangement between them which permits adjustment of the range and sensitivity of the indicator. A dog leg or range adjustment arm 62 having a slot 63 is slidably mounted on a shaft hub 59 and secured thereto by a screw 64 passing through the slot and threaded into the shaft hub 59. The hub includes an adjustment screw 61 operatively engaged with the dog leg 62 for adjustment of the dog leg and hence the pivot point 65 with respect to the shaft 57 of the armature. The shaft hub is conveniently secured to the shaft 57 by means of a set screw 57'. Pivotally mounted at 65 on one end of the link 64 is a rod or cross link 58 of constant length which is pivotally mounted at 66 to arm 67 rigidly attached to the pointer 60. This pointer pivots about point 68 and has a counterweight 69 attached to the other end.

With reference to FIGURE 10, when the distance between the shaft 57 and the pivot point 65 is equivalent to the distance between indicator arm pivot 68 and link pivot 66, or the length of arm 67, the distance of angular movement of the pointer 60 will be equal to angular movement of the armature. In order to provide adjustment in both directions, the equivalent movement position should occur when the shaft 57 is midway in the slot 63 of the dog leg 62. If the dog leg is slid so that the shaft is now at the end of the slot creating the greatest distance between the shaft and the pivot point 65, then an increment of angular movement of the armature shaft 57 will create a greater range of movement in the indicator arm as explained below.

With reference to the schematic drawing in FIGURE 11, the distance between the pivot point O of the armature shaft and the pivot point B of the link arm 58, is equal to the distance between pivot point 68 of the indicator arm and pivot point 66 of the link arm. This represents the midpoint of the adjustment range, for when the link arm pivots at B, the pivot will traverse an arc from B to B' for a given angular movement α, with the point 66 traversing an arc from X to Y of equal length. When the dog leg is moved so that the pivot point 65 is now at C, the link arm 58', as shown in phantom, will now displace pivot point 66 from X to Z on the same angular movement α of pivot point 65 from C to C'. Hence this adjustment increases the sensitivity but lowers the range of the instrument.

Conversely if the dog leg 62 is adjusted to the other end of the slot the pivot point 65 now resting at A on the drawing in FIGURE 11, the movement of point 66 will be less than before for the same angular movement of the armature axis, thus increasing the range of the indicator while decreasing its sensitivity.

The dog leg permits adjustment of the range of the indicator without changing its zero position as represented by the pivot point 66 at X.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the resonable spirit and scope of my invention.

Having thus described my invention, what I claim as new and desire to secure by Letters Patent is:

1. A pressure differential gauge comprising a pressure controlled operating means, a bearing, a spiral armature of magnetizable material supported for rotation about an axis, a non-magnetic pressure wall surrounding the armature, a magnet secured for lateral movement along the axis of the armature outside the wall responsive to movement of the pressure controlled operating means, said armature being axially adjustable within the pressure wall with respect to the magnet for zero-setting the gauge, and, more specifically, the armature being rotatably supported in cantilever fashion at one end in the bearing, said bearing being axially adjustable within the pressure wall.

2. A gauge according to claim 1, wherein the bearing is threaded into the pressure wall to provide the axial adjustment for the armature.

3. A gauge comprising a rotatable armature of magnetizable material spiralled about an axis, surrounded by a flux producing magnet magnetically coupled thereto having its pole faces on opposite sides of the armature, and by a non-magnetic pressure wall between armature and magnet, where movement of the magnet along the armature axis causes proportional rotation of the armature, wherein the pole faces of the magnet are of less cross sectional area than the cross sectional area of the body of the magnet to concentrate the flux of the magnet thereby improving the magnetic coupling between the magnet and the armature, and the pole faces are contoured to conform them to the twist of the spiralled armature.

4. A differential pressure gauge comprising a pressure controlled operating means, an indication-controlling spiral armature of magnetizable material supported for rotation about an axis, a non-magnetic pressure wall surrounding the armature, and a magnet secured for at least somewhat arcuate lateral movement along the axis of the armature outside the wall responsive to movement of the pressure controlled operating means, which magnet has flat pole faces on opposite sides of the armature and a body extending around between the faces, the body being narrowed axially of the armature in the portions of the body adjacent the pole faces to bring the extent of the pole faces in that direction down to approximately one sixth of the pitch distance of the armature and the cross-sectional area of the body being thus reduced, to concentrate the flux of the magnet in the axial direction thereby improving the magnetic coupling between the magnet and the armature, and to improve the sensitivity of indication of the gauge.

5. In a gauge, including a rotatable armature of magnetizable material spiralled about an axis, surrounded by a non-magnetic pressure wall and a flux producing magnet outside of the wall, which magnet is magnetically coupled to the armature and has flat pole faces on opposite sides of the armature, whereby movement of the magnet along the armature axis causes proportional rotation of the armature, wherein the pole faces of the magnet are narrowed in the axial direction of the armature as compared to the body of the magnet to concentrate the flux of the magnet in that direction thereby improving the magnetic coupling between the magnet and the armature and the sensitivity of the armature response and each pole face of the magnet has a total extent, in that axial direction of the armature, of approximately one-sixth of the armature pitch.

6. A gauge comprising a rotatable armature of magnetizable material spiralled about an axis, a non-magnetic pressure wall surrounding the armature, a flux producing magnet magnetically coupled to the rotatable armature and located outside of the wall which magnet includes substantially flat pole faces which are on opposite sides of the armature and have a face dimension axially of the armature of approximately one sixth of the armature pitch.

References Cited

UNITED STATES PATENTS

| | | | |
|---|---|---|---|
| 2,162,375 | 6/1939 | Christman | 74—600 X |
| 2,617,300 | 11/1952 | Kinderman | 73—407 X |
| 2,756,083 | 7/1956 | West | 73—415 X |
| 3,091,123 | 5/1963 | Locke | 73—407 |
| 3,262,317 | 7/1966 | Smith | 73—407 |

OTHER REFERENCES

Anderson, "Basic Principles of Link and Lever Adjustment," ISA Journal, January 1956, pages 10–12.

LOUIS R. PRINCE, *Primary Examiner.*

DONALD O. WOODIEL, *Assistant Examiner.*